United States Patent
Fujino et al.

[11] Patent Number: 6,126,118
[45] Date of Patent: Oct. 3, 2000

[54] FLOW SEPARATOR REDUCER

[75] Inventors: Michimasa Fujino; Yuichi Kawamura, both of Wako, Japan

[73] Assignee: Honda Giken Kogyo Kabushiki Kaisha, Tokyo, Japan

[21] Appl. No.: 08/853,273

[22] Filed: May 9, 1997

[30] Foreign Application Priority Data

May 9, 1996 [JP] Japan .................................. 8-114595

[51] Int. Cl.$^7$ .................................................. B64C 23/06
[52] U.S. Cl. ............................................................ 244/199
[58] Field of Search ........................... 244/199, 54, 130, 244/55, 200; 60/39.31; 248/554

[56] References Cited

U.S. PATENT DOCUMENTS

| | | | |
|---|---|---|---|
| 2,650,752 | 9/1953 | Hoadley | 244/130 |
| 3,727,862 | 4/1973 | Kaufhold et al. | 244/54 |
| 3,744,745 | 7/1973 | Kerker et al. | 244/199 |
| 4,298,089 | 11/1981 | Birch et al. | 60/59.31 |
| 4,449,680 | 5/1984 | Gratzer et al. | 244/130 |
| 4,466,587 | 8/1984 | Dusa et al. | 244/199 |
| 4,489,905 | 12/1984 | Bengelink et al. | 244/130 |
| 4,540,143 | 9/1985 | Wang et al. | 244/130 |
| 4,655,419 | 4/1987 | Van Der Hoeven | 244/199 |
| 4,685,643 | 8/1987 | Henderson et al. | 244/199 |
| 4,801,058 | 1/1989 | Mullins | 244/54 |
| 4,884,772 | 12/1989 | Kraft | 244/199 |
| 5,443,230 | 8/1995 | Lord et al. | 244/54 |
| 5,598,990 | 2/1997 | Farokhi et al. | 244/200 |
| 5,785,282 | 7/1998 | Wake et al. | 244/200 |
| 5,788,191 | 8/1998 | Wake et al. | 244/200 |

*Primary Examiner*—Peter M. Poon
*Assistant Examiner*—Francis T. Palo
*Attorney, Agent, or Firm*—Lyon & Lyon LLP

[57] ABSTRACT

A flow separation reducer comprises a vane which prevents an airflow from being separated in a flow interference region where a plurality of members, such as a main wing and a pylon, are joined to each other. The vane is disposed in a location where the airflow along a surface of one of the members develops a minimum negative pressure. The vane has a predetermined angle of attack with respect to the airflow for generating a vortex downstream of the vane with respect to the airflow and causing a circulation around the vane to reduce the speed of the airflow in the location.

10 Claims, 3 Drawing Sheets

FLOW SEPARATOR REDUCER

BACKGROUND OF THE INVENTION

1. Field of the Invention

The present invention relates to a flow separation reducer for preventing an airflow from being separated from an aircraft surface region where turbulent and separated flows tend to occur, such as at a joint between a main wing and an engine nacelle.

2. Description of the Related Art

On aircrafts with engines mounted on main wings, airflows produced by engine nacelles and the main wings interfere with each other at joints where they are coupled to each other, producing different flow patterns from those which would be generated by the engine nacelles and the main wings if they were separate and independent from each other. Such a phenomenon is refereed to as flow interference. One known attempt to suppress separated flows in flow interference regions has been to use fillets or the like which provide smooth surfaces at the joints between the engine nacelles and the main wings.

According to a structure for preventing an airflow from being separated, a small vortex generator is mounted on an upper surface of a main wing, for example, for dispersing a boundary layer prior to being separated thereby to delay the separation of the flow.

U.S. Pat. No. 4,540,143 discloses a wake control device mounted on an upper surface of an engine nacelle supported on a main wing for shedding a strong vortex which prevents a nacelle wake from spreading over the upper surface of the main wing.

Vortex control devices are revealed in U.S. Pat. Nos. 4,685,643 and 4,884,772, and liftvanes are shown in U.S. Pat. No. 3,744,745.

The use of fillets which provide smooth surfaces at the joints between the engine nacelles and the main wings is effective in regions where violent turbulent and separated flows are produced. However, since the fillets increase the frontal area of the engine nacelle and main wing combination, they also increase the aerodynamic drag thereof. Furthermore, the application of a fillet to an existing aircraft structure would need a substantial modification of the aircraft structure. For these reasons, it has not been an easy and simple choice to use fillets to prevent flow separation.

Vortex generators can relatively easily be installed on existing aircraft structures. The vortex generators are, however, comparatively ineffective and incapable of preventing flow separation in regions of very violent flow.

SUMMARY OF THE INVENTION

It is therefore an object of the present invention to provide a flow separation reducer which can easily and simply be applied to an existing aircraft structure without the need for a substantial modification there of and which is effectively capable of preventing flows from being separated even in regions that are subject to violent turbulent.

According to the present invention, there is provided a flow separation reducer for preventing an airflow from being separated in a flow interference region where a plurality of members are joined to each other, comprising a vane disposed in a location where an airflow along a surface of one of the members develops a minimum negative pressure, the vane having a predetermined angle of attack with respect to the airflow for generating a vortex downstream of the vane with respect to the airflow and causing a circulation around the vane to minimize the speed of the airflow in the location.

The vane comprises a substantially triangular plate and has a pointed end positioned upstream with respect to the flow. One of the joined members compris es a pylon with an engine nacelle mounted thereon and the other of the members comprises an aircraft wing supporting the pylon, the vane being mounted on the aircraft wing near a leading edge thereof, further comprising another vane mounted on the engine nacelle downstream of the first-mentioned vane with respect to the flow. The first-mentioned vane is oriented such that a lift generated thereon by the angle of attack is directed away from the pylon.

According to the present invention, there is also provided a flow control device on an aircraft structure, comprising a first airfoil surface, a second surface joined to the first airfoil surface in a flow interference region, and a vane mounted on the second airfoil surface near a location in the flow interference region where an airflow flowing along the first airfoil surface develops a minimum negative pressure, for generating a vortex downstream of the vane with respect to the flow and causing a circulation around the vane to the speed of the flow in the location thereby preventing the airflow from being separated from the first surface and the second surface. The vane comprises a substantially triangular plate and has a pointed end positioned upstream with respect to the flow. The first surface comprises a pylon surface, and the second surface comprises a wing surface.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 1:
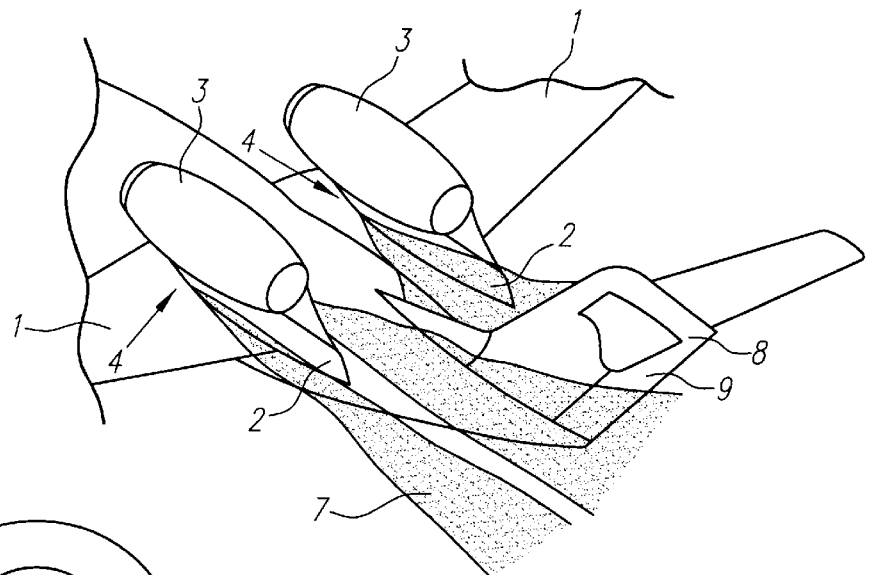
FIG. 1 is a fragmentary perspective view showing how airflows are separated at joints between aircraft main wings and engine nacelles.
Figure 2:
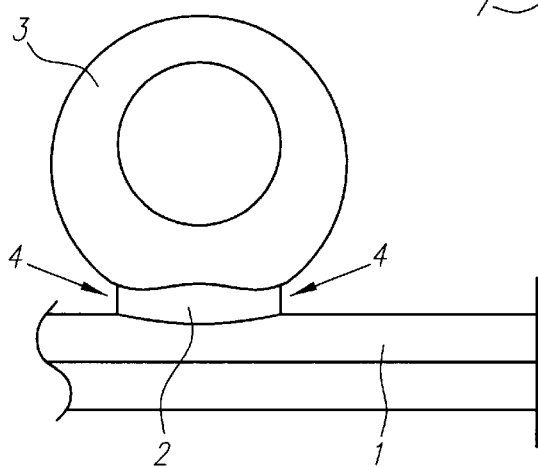
FIG. 2 is a fragmentary front elevation view of one of the joints shown in FIG. 1.

As shown in FIGS. 1 and 2, an aircraft structure has main wings 1 with engine nacelles 3 coupled to upper surfaces thereof by respective pylons 2. A flow separation reducer according to the present invention is used to prevent a flow from being separated in flow interference regions 4 which are partially surrounded by the upper surfaces of the main wings 1, the pylons 2, and the engine nacelles 3.

Each of the flow interference regions 4 has the pylon 2 and the engine nacelle 3 installed on an upper surface of the main wing 1 where airflows are accelerated by the curvature of the upper surface of the main wing 1. Since the pylon 2 and the engine nacelle 3 has exterior surfaces curved as with the upper surface of the main wing 1, the airflows in the flow interference region 4 are further accelerated along these curved surfaces. The accelerated airflows are widely spread in downstream portions of the flow interference regions 4, and separated from the main wings 1. When the separated airflows are spread toward the fuselage as indicated by hatched flow areas 7 in FIG. 1, they tend to adversely affect a rudder 9 of a vertical tail 8 on the rear end of the fuselage. If the separated airflows interfere with the rudder 9, then they will cause the aircraft structure to vibrate and impair the stability of the aircraft.

Figure 3:
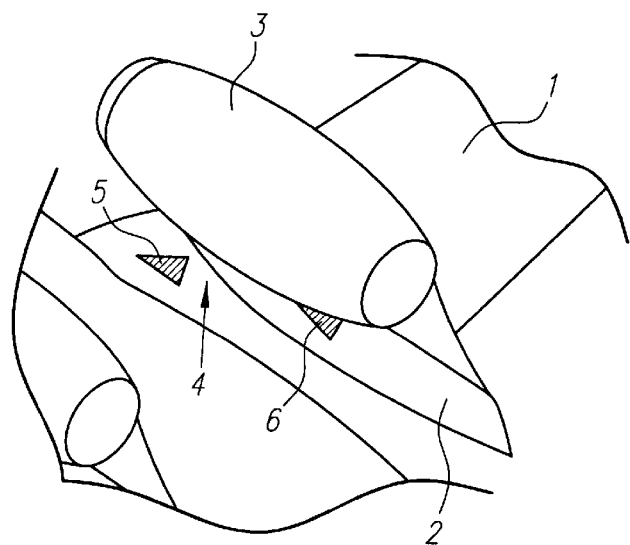
FIG. 3 is a fragmentary perspective view of a flow separation reducer according to the present invention in one of the joints.

According to the present invention, as shown in FIG. 3, the flow separation reducer, which is designed to prevent airflows from being separated in the flow interference regions 4, comprises a front vane 5 mounted on each of the main wings 1 near the leading edge thereof and protruding laterally upwardly near the pylon 2, and a rear vane 6 positioned downstream of the front vane 5 and protruding downwardly from a rear side wall of the engine nacelle 3. The rear vane 6 generates a strong vortex downstream thereof for holding airflows, which would otherwise be liable to be separated and spread, against the exterior surfaces of the engine nacelle 3 and the pylon 2 with the vortex energy for thereby preventing the airflows from being spread in a manner well known in the art. The front vane 5 operates and offers advantages as described later on.

Figure 4:
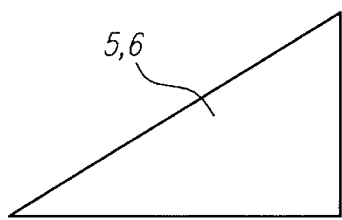
FIG. 4 is a side elevational view of a front vane of the flow separation reducer.

The front and rear vanes 5, 6 are of an identical triangular shape, as shown in FIG. 4, and have respective pointed ends directed upstream with respect to airflows generated along the main wing 1, the engine nacelle 2, and the pylon 3. The rear vane 6 projects substantially perpendicularly to the exterior surface of the engine nacelle 3 for shedding the vortex downstream. Details of the rear vane 6 will not be described below as they are essentially known in the art.

Figure 5:
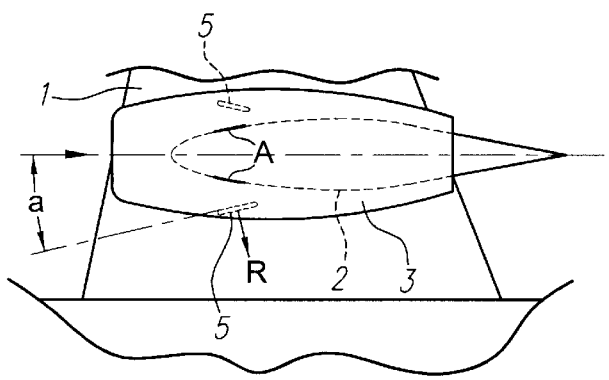
FIG. 5 is a fragmentary plan view showing locations where front vanes are installed on the main wing relatively to the engine nacelle.

As shown in FIG. 5, there are actually two front vanes 5 positioned one on each side of the pylon 2 at respective locations A where the speed of flows along the pylon 2 is near maximum. In those locations A, the negative pressure developed by the airflows is near maximum. The front vanes 5 are inclined at an angle "a" to the axis of the engine nacelle 3 such that the front vanes 5 have an angle $\alpha$ of attack (see FIGS. 7 and 8) with respect to the direction of the flow along the respective exterior surfaces of the pylon 2. The angle $\alpha$ of attack is oriented such that a lift R acting on each of the front vanes 5 is directed away from the pylon 2.

Each of the front vanes 5 offers the following advantages:

(1) The front vane 5 generates a strong vortex at its leading edge which is applied as a spreading vortex to the flow that tends to be spread and separated, thereby suppressing the separation of the airflow.

(2) The front vane 5 is installed in the location A at such an angle of attack as to reduce the maximum speed of the airflow along the exterior surface of the pylon 2. This is effective to make less steep a pressure recovery gradient in the location A.

(3) With the angle $\alpha$ of attack of the front vane 5, the front vane 5 deflects the airflow toward the pylon 2 while preventing it from spreading around.

The above advantages (2) and (3), in particular, accrue from the flow separation reducer according to the present invention.

The advantage (1) is well known in the art in that the front vane 5 is installed at the angle $\alpha$ of attack with respect to the airflow for generating a strong vortex with respect to the flow that is likely to spread. The angle $\alpha$ of attack for the triangular front vane 5 may be in the range between 12 degrees and 15 degrees for good results. In the illustrated embodiment, the angle $\alpha$ of attack is about 15 degrees.

Figure 6:
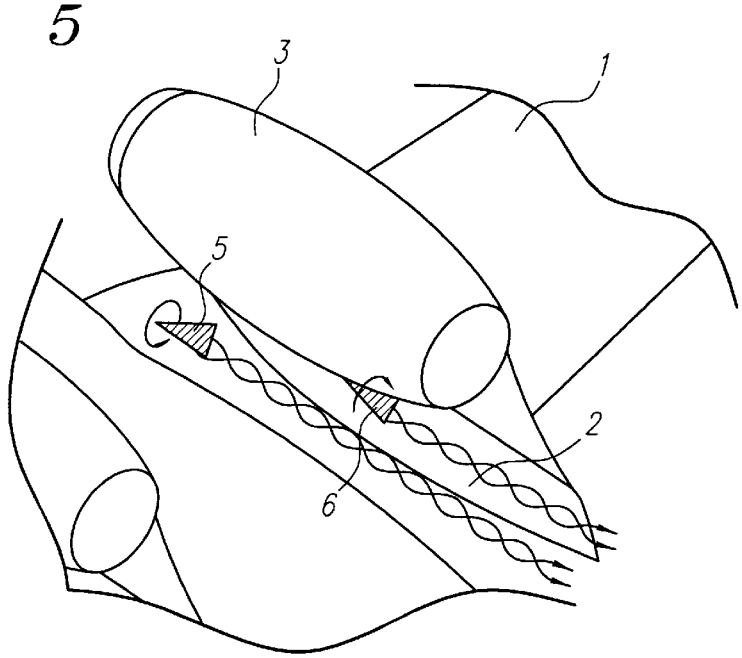
FIG. 6 is a view similar to FIG. 3, showing vortices generated by front and rear vanes of the flow separation reducer.

As shown in FIG. 6, the front vane 5 generates a vortex which causes the airflow which would otherwise tend to be separated to flow along the surface layers of the main wing 1 and the pylon 2. The rear vane 6 also generates a vortex which also serves to prevent the airflow from being separated. Both the front and rear vanes 5, 6 are effective to prevent the airflow from being spread in opposite directions away from each other.

Figure 7:
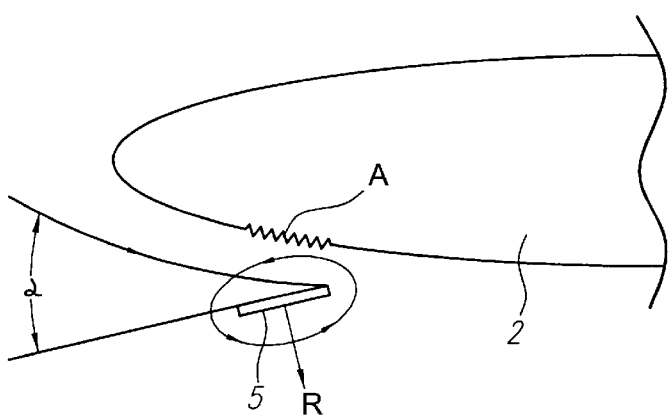
FIG. 7 is a fragmentary plan view illustrative of a circulation flow around the front vane.
Figure 8:
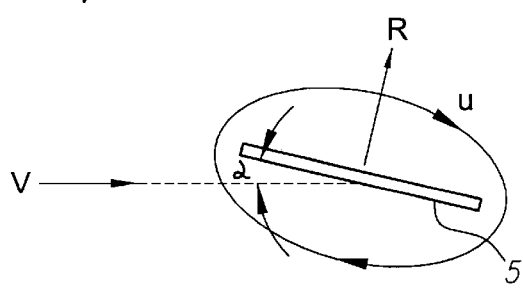
FIG. 8 is a plan view illustrative of the circulation flow.

The advantage (2) will be described below. As shown in FIG. 7, the front vane 5 is tilted at the angle $\alpha$ of attack to the airflow along the pylon 2 for directing the lift R generated on the front vane 5 away from the pylon 2, so that the speed of the airflow is reduced in the location A where the speed of the airflow is maximum. The lift R is generated on the front vane 5 because air streams flowing along both sides of the front vane 5 have different speeds. Theoretically, there is a circulation flow produced around the front vane 5 according to the Kutta-Joukowsky's theorem. More specifically, as also shown in FIG. 8, it is assumed that the airflow has a speed V in the absence of any obstacles therein, and the circulation flow around the front vane 5 has a speed u. With the front vane 5 placed in the airflow, the net result is that the air stream flowing on one side of the front vane 5 has a speed (V+u), lowering the air pressure (static pressure) on that side of the front vane 5, and the air stream flowing on the other side of the front vane 5 has a speed (V−u) increasing the air pressure (static pressure) on that side of the front vane 5. As a result, the lift R is generated on the front vane 5 because of the speed difference. The front vane 5 is positioned in the location A and its angle $\alpha$ of attack is adjusted such that the circulation flow is oriented in a direction which is opposite to the airflow in the location A. In this manner, the speed of the airflow in the location A is reduced. Since the speed of the airflow in the location A is reduced, the speed of the airflow along the surface of the pylon 2 is reduced, making the airflow along the exterior surface of the pylon 2 less liable to be separated from the pylon 2.

Figure 9:
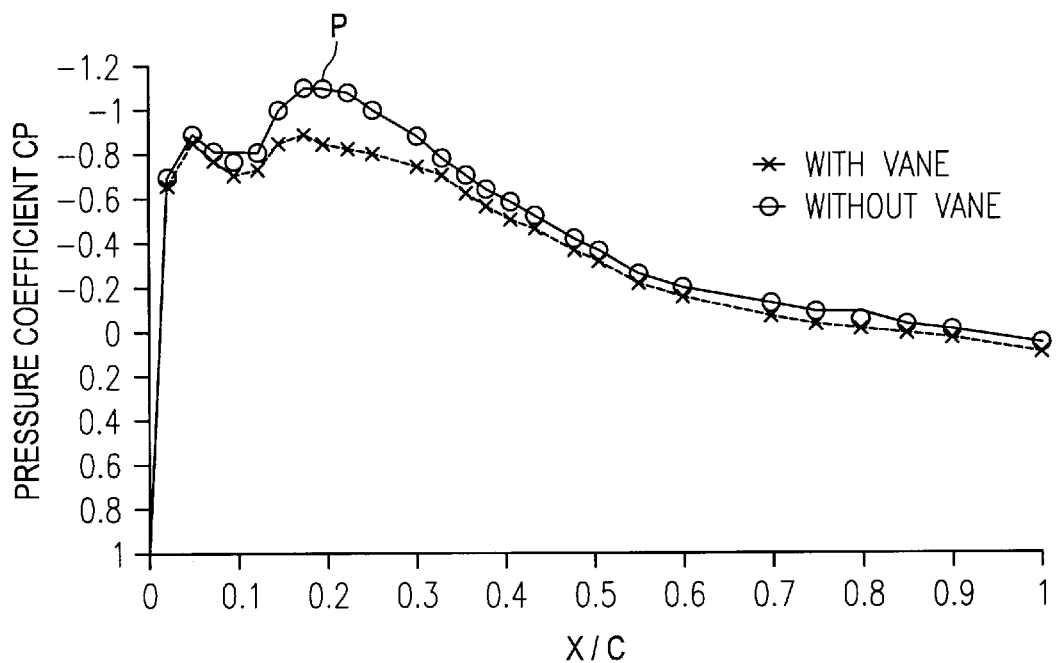
FIG. 9 is a graph showing pressure distributions in a cross section of a pylon.

FIG. 9 is a graph showing air pressure distributions in a cross section of the pylon. The graph has a horizontal axis representing a chord ratio (X/C) where X indicates the distance from the leading edge of the pylon and C the chord length of the pylon, and a vertical axis representing a pressure coefficient (flow speed). The solid-line curve represents a pressure distribution plotted when no front vane 5 is as installed, and the broken-line curve represents a pressure distribution plotted when a front vane 3 was installed. It can be seen from FIG. 9 that a peak pressure coefficient P in the location A is reduced by the front vane 5.

As a consequence, the pressure recovery gradient (speed difference) is reduced in the location A, making it effective to reduce the tendency of the airflow from being separated from the pylon 2.

The triangular front vane 5 has a small aspect ratio, i.e., a ratio of its horizontal dimension to its vertical dimension, and the pointed end is positioned upstream of the wider end with respect to the direction of the airflow. Consequently, even if the angle α of attack is relatively large, the front vane 5 is less likely to cause stall and can maintain the circulation flow therearound. The angle α of attack can thus be made large enough to increase the intensity of the vortex generated by the leading end of the front vane 5 for preventing the airflow from being separated highly effectively.

According to the advantage (3), which is related to the advantage (2), the circulation flow around the front vane 5 is directed as shown in FIG. 7, guiding the incoming airflow toward the pylon 2 against its tendency to be separated and spread.

Figure 10:
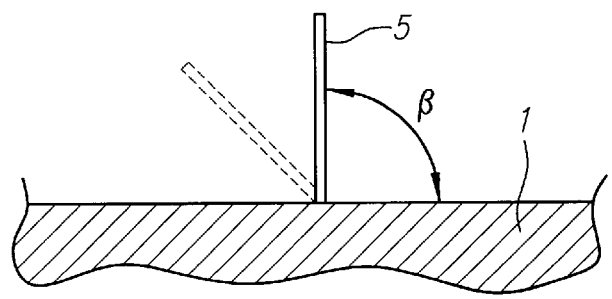
FIG. 10 is a cross-sectional view illustrative of an angle at which the front vane is vertically mounted on the main wing.

For achieving the advantages (1)~(3) as much as possible, the front vane 5 is of a triangular shape, and as illustrated in FIG. 10, the front vane 5 is mounted substantially vertically on the upper surface of the main wing 1 at a substantially right angle β. However, for the purpose of generating a vortex and a lift, the front vane 5 may be of a rectangular shape, a curved shape, or another shape. To minimize the speed of the flow in the location A, the front vane 5 may be inclined to the vertical plane as indicated by the phantom lines in FIG. 10 at an angle which depends on the outer profile of the pylon 2.

The flow separation reducer according to the present invention may be applied to not only a flow interference region at the joint between a main wing and an engine nacelle, but also other flow interference regions at the joint between a horizontal tail and a vertical tail and at the joint between a main wing and a fuselage without substantial modifications of existing aircraft structures.

The principles of the present invention are also applicable to flow interference regions on vehicles other than aircrafts, such as automobiles, or structures involving fluid dynamics such as bridge girders for preventing vibrations due to flow separations and structural fatigue resulting from such vibrations.

Although there has been described what is at present considered to be the preferred embodiment of the invention, it will be understood that the invention may be embodied in other specific forms without departing from the essential characteristics thereof. The present embodiments is therefore to be considered in all respects as illustrative, and not restrictive. The scope of the invention is indicated by the appended claims rather than by the foregoing description.

What is claimed is:

1. A flow separator reducer for preventing an airflow from being separated in a flow interference region where a plurality of members are joined to each other comprising a vane disposed in a location where an airflow along a surface of one of the members develops a negative pressure, said vane having a predetermined angle of attack with respect to said airflow for generating a vortex downstream of the vane with respect to said airflow and minimizing the speed of the airflow in said location, wherein said vane comprises a substantially triangular plate and has a pointed end positioned upstream with respect to said airflow, wherein said one of the members comprises a pylon with an engine nacelle mounted thereon and the other of the members comprises an aircraft wing supporting said pylon, said vane being mounted on said aircraft wing near a leading edge thereof, and another vane mounted on said engine nacelle downstream of the first-mentioned vane with respect to said flow.

2. A flow separation reducer according to claim 1, wherein said first-mentioned vane is oriented such that a lift generated thereon by the angle of attack is directed away from said pylon.

3. A flow separation reducer according to claim 1, wherein said vane is located laterally of a point on said pylon where the negative pressure of air flowing along the surface of said pylon is at a maximum amount when measured without said vane being positioned on said aircraft wing.

4. A flow separation reducer for preventing an airflow from being separated in a flow interference region where a pylon with an engine nacelle mounted thereon and an aircraft wing supporting said pylon are joined to each other, comprising a vane mounted on said aircraft wing near a leading edge thereof and protruding upwardly near a lateral side of said pylon where an airflow along a surface of said pylon develops a negative pressure, said vane having a predetermined angle of attack with respect to said airflow for generating a vortex downstream of the vane with respect to said airflow and minimizing the speed of the airflow in said location, and said vane comprising a substantially triangular plate having a pointed end positioned upstream with respect to said airflow, wherein said vane is oriented such that a lift generated thereon by the angle of attack is directed away from said pylon.

5. A flow separation reducer according to claim 4, wherein said triangular vane has an angle of attack in a range of 12 degrees to 15 degrees.

6. A flow separation reducer according to claim 4, wherein said vane is located laterally of a point on said pylon where the negative pressure of air flowing along the surface of said pylon is at a maximum amount when measured without said vane being positioned on said aircraft wing.

7. A flow separation reducer for preventing an airflow from being separated in a flow interference region where a plurality of members are joined to each other, comprising a vane disposed in a location where an airflow along a surface of one of the members develops a negative pressure, said vane having a predetermined an generating a vortex downstream of the vane with respect to said airflow and minimizing the speed of the airflow in said location, said vane comprising a substantially triangular plate having a pointed end positioned upstream with respect to said airflow, wherein the pressure recovery gradient is reduced in said location of said vane where the negative pressure is developed by the airflow along the surface of said one member.

8. A flow separation reducer according to claim 7, wherein said one of the members comprises a pylon with an engine nacelle mounted thereon and the other of the members comprises an aircraft wing supporting said pylon, said vane being mounted on said aircraft wing near a leading edge thereof, further comprising another vane mounted on said engine nacelle downstream of the first-mentioned vane with respect to said flow.

9. A flow separation reducer according to claim 8, wherein said first-mentioned vane is oriented such that a lift generated thereon by the angle of attack is directed away from said pylon.

10. A flow separation reducer according to claim 7, wherein said vane is located laterally of a point on said one member where the negative pressure of air flowing along said surface of said one member is at a maximum amount when measured without said vane being positioned on another of said plurality of joined members.

* * * * *

UNITED STATES PATENT AND TRADEMARK OFFICE
CERTIFICATE OF CORRECTION

PATENT NO.    : 6,126,118
DATED         : October 3, 2000
INVENTOR(S)   : Fujino et al.

It is certified that error appears in the above-identified patent and that said Letters Patent is hereby corrected as shown below:

<u>Colum 6,</u>
Line 36, after "predetermined" delete "an" and insert -- angle of attack with respect to said airflow for --.

Signed and Sealed this

Sixteenth Day of July, 2002

*Attest:*

JAMES E. ROGAN
*Director of the United States Patent and Trademark Office*

*Attesting Officer*